United States Patent
Ohashi et al.

(10) Patent No.: US 12,336,004 B2
(45) Date of Patent: Jun. 17, 2025

(54) CONTROL DEVICE AND CONTROL METHOD

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP); Yuki Kono, Aichi (JP); Shigenori Nitta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 400 days.

(21) Appl. No.: 17/914,547

(22) PCT Filed: Feb. 1, 2021

(86) PCT No.: PCT/JP2021/003506
§ 371 (c)(1),
(2) Date: Sep. 26, 2022

(87) PCT Pub. No.: WO2021/250928
PCT Pub. Date: Dec. 16, 2021

(65) Prior Publication Data
US 2023/0144952 A1    May 11, 2023

(30) Foreign Application Priority Data
Jun. 9, 2020   (JP) ................................ 2020-099819

(51) Int. Cl.
*H04W 74/0808* (2024.01)
*G01S 5/00* (2006.01)
*H04W 12/06* (2021.01)

(52) U.S. Cl.
CPC ....... *H04W 74/0808* (2013.01); *G01S 5/0063* (2013.01); *H04W 12/06* (2013.01)

(58) Field of Classification Search
CPC . H04W 74/0808; H04W 12/06; H04W 12/33; H04W 12/63; H04W 4/40;
(Continued)

(56) References Cited

U.S. PATENT DOCUMENTS 9,633,496 B2 *  4/2017  Van Wiemeersch .... B60R 25/33
2007/0159321 A1 *  7/2007  Ogata .................. A61B 5/0002
                                                    340/539.12
(Continued)

FOREIGN PATENT DOCUMENTS

EP        2018998 A1 *  1/2009  ............ B60R 25/24
JP        2019-31871 A    2/2019
JP        2019-197993 A   11/2019

OTHER PUBLICATIONS

International Search Report issued in International Bureau of WIPO Patent Application No. PCT/JP2021/003506, dated Apr. 20, 2021, along with an English translation thereof.

*Primary Examiner* — Brandon J Miller
(74) *Attorney, Agent, or Firm* — GREENBLUM & BERNSTEIN, P.L.C.

(57) ABSTRACT

A control device and a control method that can reduce power consumption for waiting for reception of a signal are provided. The control device includes a controller configured to control a communicator such that the communicator performs wireless communication with another device. The controller controls a reception waiting time of a predetermined signal which is transmitted from the other device by the wireless communication on the basis of acquired acquisition information.

16 Claims, 3 Drawing Sheets

(58) Field of Classification Search
CPC ...... G01S 5/0063; G01S 13/765; G01S 7/006; G07C 2209/63; G07C 9/00309; H04L 63/0853; B60R 25/24
See application file for complete search history.

(56) References Cited

U.S. PATENT DOCUMENTS

| | | | |
|---|---|---|---|
| 2018/0190053 A1* | 7/2018 | Wu ........................ | H04W 76/14 |
| 2019/0051072 A1 | 2/2019 | Okada | |
| 2019/0147678 A1* | 5/2019 | Saiki ....................... | B60R 25/24 |
| | | | 340/5.64 |
| 2020/0057732 A1* | 2/2020 | Okuno .................... | G06F 21/77 |
| 2020/0363524 A1* | 11/2020 | Yoon ................... | H04W 12/069 |

* cited by examiner

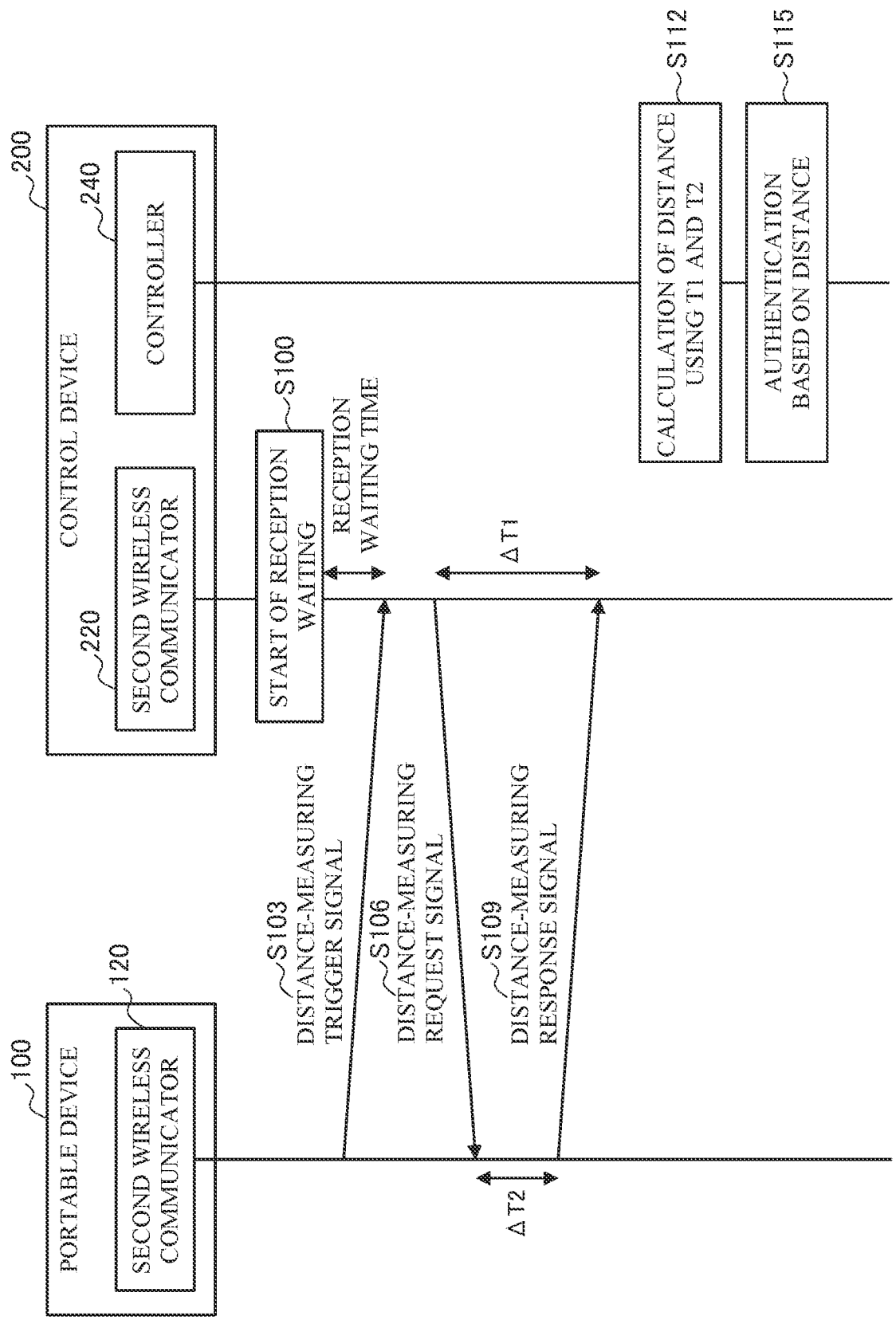

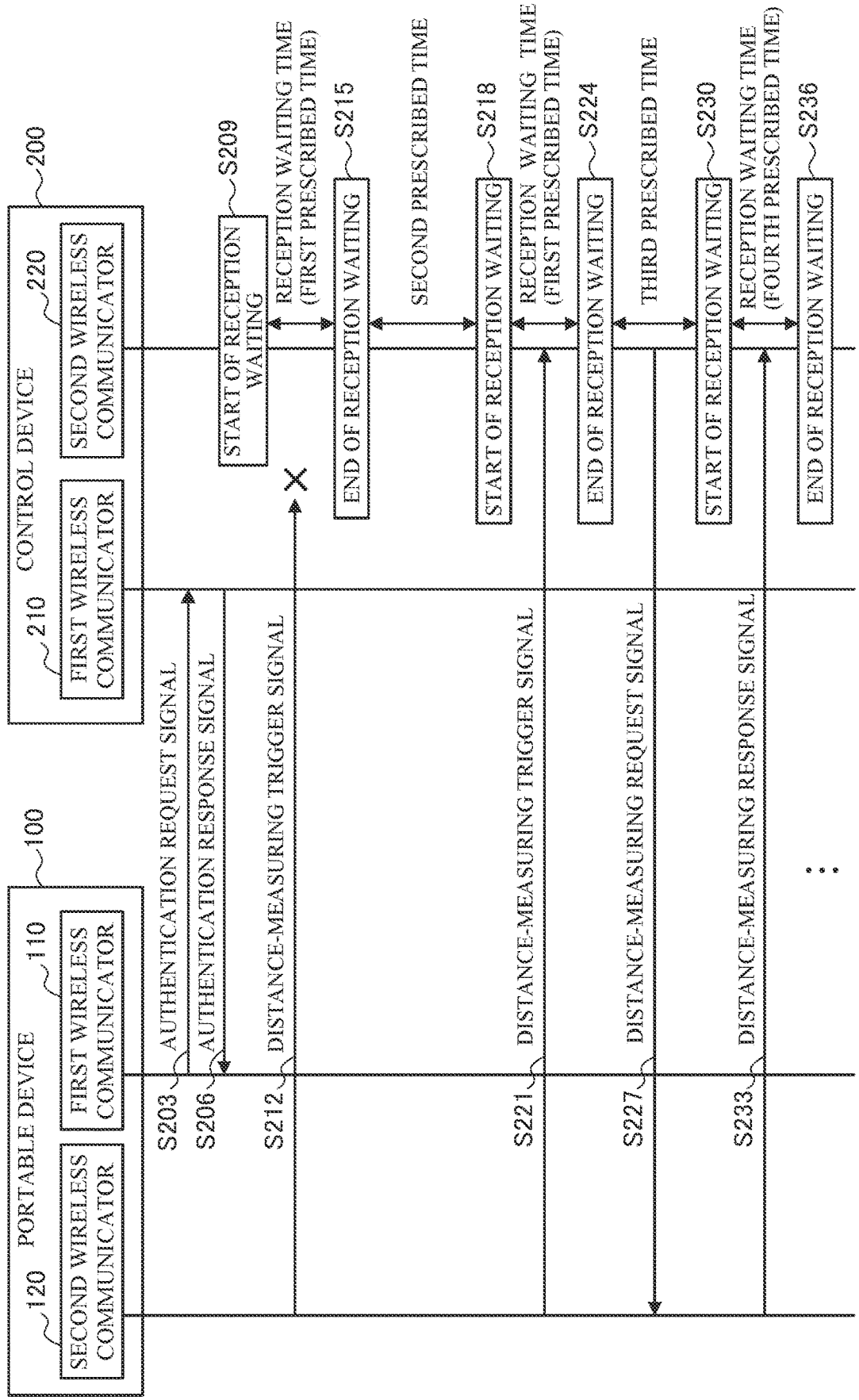

CONTROL DEVICE AND CONTROL METHOD

TECHNICAL FIELD

The present invention relates to a control device and a control method.

BACKGROUND ART

Recently, techniques of authenticating a device on the basis of results of transmission and reception of signals between devices have been developed. For example, in Patent Literature 1, an onboard device authenticates a portable device by transmitting and receiving signals to and from the portable device using a first communication unit. The portable device is a remote controller that performs locking or unlocking of a vehicle and is also referred to as a smart key. The portable device is carried by a driver. Patent Literature 1 discloses a smart-keying system in which the onboard device determines whether to permit a vehicle operation by measuring a distance to the portable device using a second communication unit in addition to authentication using the first communication unit.

CITATION LIST

Patent Literature

Patent Literature 1: JP 2019-31871A

SUMMARY OF INVENTION

Technical Problem

However, in the technique disclosed in Patent Literature 1, when signals for authentication are transmitted and received between devices, power consumption in a party receiving a signal is forced in a signal reception waiting period. These circumstances are true of signals other than the signals for authenticating a device.

Therefore, the present invention has been made in consideration of the aforementioned circumstances, and an objective of the present invention is to provide a control device and a control method that are novel and improved and that can reduce power consumption for waiting for reception of a signal.

Solution to Problem

To solve the above problem, according to an aspect of the present invention, there is provided a control device comprising a controller configured to control a communicator such that the communicator performs wireless communication with another device, wherein the controller controls a reception waiting time of a predetermined signal which is transmitted from the other device by the wireless communication on the basis of acquired acquisition information.

To solve the above problem, according to another aspect of the present invention, there is provided a control method that is performed by a processor, the control method comprising controlling a communicator such that the communicator performs wireless communication with another device; and controlling a reception waiting time of a predetermined signal which is transmitted from the other device by the wireless communication on the basis of acquired notification information.

Advantageous Effects of Invention

As described above, according to the present invention, it is possible to reduce power consumption for waiting for reception of a signal.

BRIEF DESCRIPTION OF DRAWINGS

FIG. 2 is a sequence diagram illustrating an example of a basic flow of an authentication process according to the embodiment.

FIG. 3 is a sequence diagram illustrating an example of a flow of a distance measuring process which is performed in the system according to the embodiment.

DESCRIPTION OF EMBODIMENTS

Figure 1:
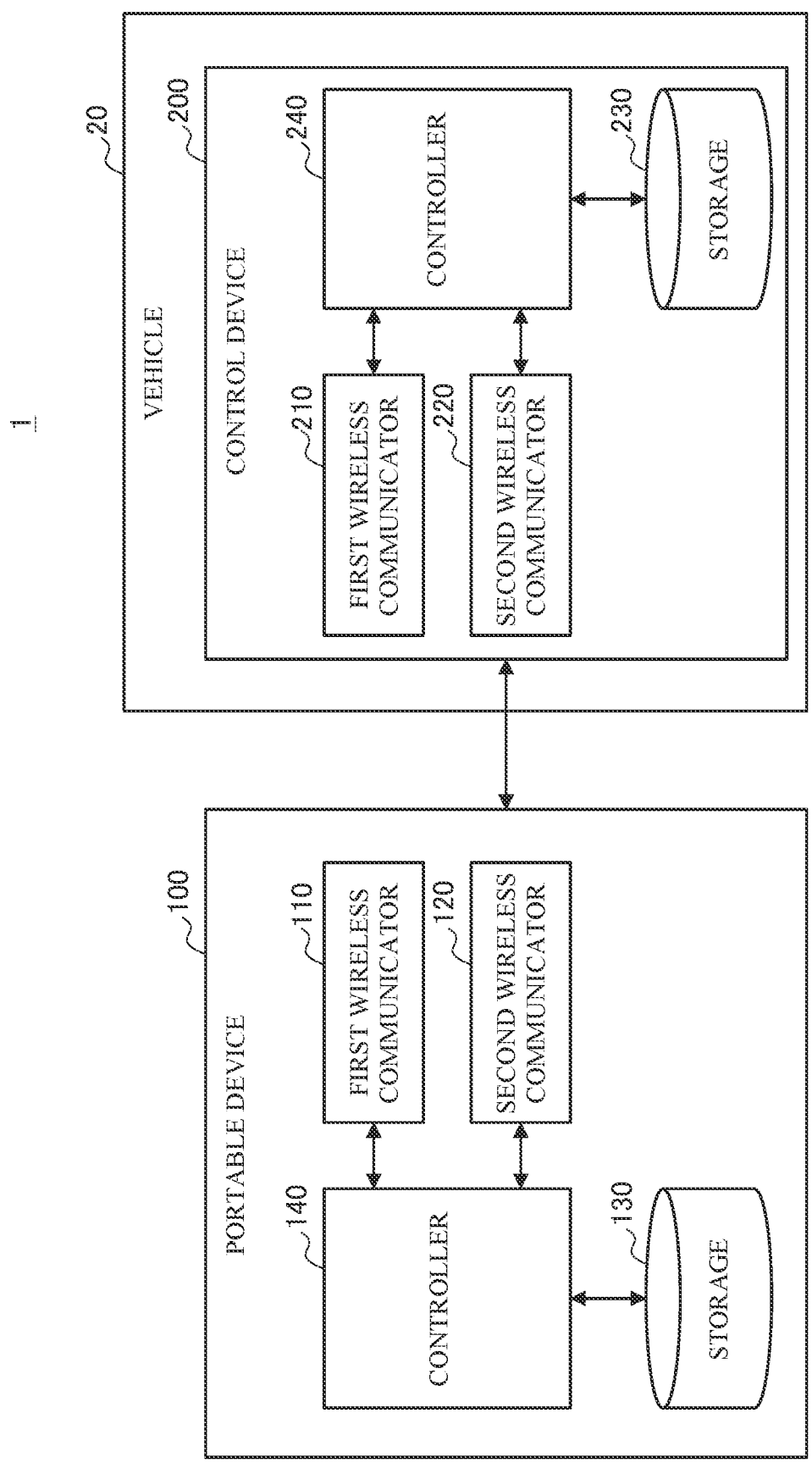
FIG. 1 is a diagram illustrating an example of a configuration of a system according to an embodiment of the present invention.

Hereinafter, an exemplary embodiment of the present invention will be described in detail with reference to the accompanying drawings. In this specification and the drawings, elements having substantially the same functional configurations will be referred to by the same reference signs, and repeated description thereof will be omitted.

<1. Example of Configuration>

FIG. 1 is a diagram illustrating an example of a configuration of a system 1 according to an embodiment of the present invention. As illustrated in FIG. 1, the system 1 according to the embodiment includes a portable device 100 and a control device 200. The control device 200 according to the embodiment is mounted, for example, in a vehicle. The vehicle is an example of a mobile object which is one object for use of a user.

A communication device that is an authentication target device and a control device that includes a controller configured to perform an authentication process of authenticating the communication device using information acquired through communication with the communication device are involved in the present invention. In the example illustrated in FIG. 1, the portable device 100 is an example of the communication device, and the control device 200 is an example of the control device. In the system 1, for example, when a user such as a driver of a vehicle 20 approaches the vehicle with the portable device 100, wireless communication for authentication is performed between the portable device 100 and the control device 200 mounted in the vehicle 20. When the authentication succeeds, a door of the vehicle 20 is unlocked or an engine is started, and the vehicle 20 becomes usable by the user. The system 1 is also referred to as a smart entry system. The elements will be sequentially described below.

(1-1) Portable Device 100

The portable device 100 is configured as an arbitrary device. As an example of the arbitrary device, a device such as an electronic key, a smartphone, or a wearable terminal which is carried and used by a user such as a driver can be used. As illustrated in FIG. 1, the portable device 100 includes a first wireless communicator 110, a second wireless communicator 120, a storage 130, and a controller 140.

The first wireless communicator 110 has a function of communicating with the control device 200 based on a first wireless communication standard. The second wireless communicator 120 has a function of communicating with the control device 200 based on a second wireless communication standard which is different from the first wireless communication standard. Particularly, the second wireless communication standard is more appropriate for measuring a distance than the first wireless communication standard, and the second wireless communicator 120 mainly takes charge of communication associated with distance measuring.

Here, the first wireless communication standard may satisfy at least one of a condition that a gain is higher and a condition that power consumption on a reception side is lower in comparison with the second wireless communication standard. In a specific example in which such conditions are satisfied, carrier waves of a frequency higher than a frequency of carrier waves in the first wireless communication standard may be used in the second wireless communication standard. This is because attenuation according to a distance becomes larger and thus a gain becomes lower as the frequency of carrier waves becomes higher, attenuation according to a distance becomes smaller and thus a gain becomes higher as the frequency of carrier waves becomes lower, and the conditions for the gain are satisfied. When the frequency of carrier waves is high, an influence of a human body such as absorption in the human body increases and the gain decreases.

In consideration of that a sampling frequency is set based on a maximum value of the frequency of carrier waves, at least a condition that a maximum frequency of carrier waves in the second wireless communication standard is higher than a maximum frequency of carrier waves in the first wireless communication standard has only to be satisfied.

For example, signals in a radio frequency (RF) band and signals in a low frequency (LF) band may be used in the first wireless communication standard. In a typical smart entry system, signals in the RF band are used for transmission from the portable device 100 to the control device 200 of the vehicle 20, and signals in the LF band are used for transmission from the control device 200 of the vehicle 20 to the portable device 100. In the following description, it is assumed that the first wireless communicator 110 is constituted as a communication interface that can perform communication using signals in the RF band and signals in the LF band. That is, in the following description, it is assumed that the signals in the RF band are used for transmission to the control device 200 of the vehicle 20 and the signals in the LF band are used for reception from the control device 200 of the vehicle 20.

For example, signals in an ultra-wide band (UWB) may be used in the second wireless communication standard. Signals in an impulse manner in the UWB have characteristics that positioning and distance measuring can be performed with high accuracy using the signals. That is, an air propagation time of radio waves with a very short pulse width equal to or less than a nanosecond can be measured with high accuracy using the radio waves, and positioning and distance measuring based on the propagation time can be performed with high accuracy. In the following description, it is assumed that the second wireless communicator 120 is constituted by a communication interface that can perform communication using the signals in the UWB.

A signal in the UWB can be transmitted and received as a distance-measuring signal and a data signal. The distance-measuring signal is a signal that is transmitted and received in a distance measuring process which will be described later. For example, the distance-measuring signal may have a frame format not including a payload part in which data is stored or may have a frame format including a payload part in which data is stored. The data signal is a signal for carrying data. The data signal preferably has a frame format including a payload part in which data is stored. In the following description, it is assumed that the distance-measuring signal has a frame format not including a payload part in which data is stored. It is also assumed that the data signal has a frame format including a payload part in which data is stored.

The storage 130 has a function of storing various types of information for operating of the portable device 100. For example, the storage 130 stores programs for operating of the portable device 100, IDs (an example of identification information), passwords, and authentication algorithms for authentication, and the like. The storage 130 is constituted, for example, by a storage medium such as a flash memory and a processing device that performs writing and reading to and from the storage medium.

The controller 140 has a function of controlling the entire operations of the portable device 100. For example, the controller 140 controls the first wireless communicator 110 and the second wireless communicator 120 such that communication with the control device 200 of the vehicle is performed. The controller 140 performs reading information from the storage 130 and writing information to the storage 130. The controller 140 also serves as an authentication controller that controls an authentication process which is performed in cooperation with the control device 200 of the vehicle. The controller 140 is constituted, for example, by an electronic circuit such as a central processing unit (CPU) and a microprocessor.

(1-2) Control Device 200

The control device 200 is provided in correlation with a vehicle. Here, it is assumed that the control device 200 is mounted in the vehicle 20. Regarding the mounting position, the control device 200 may be installed in a cabin of the vehicle 20 or may be incorporated into the vehicle 20 as a control module or a communication module. The control device 200 may be provided in a parking lot of the vehicle 20. In this way, the control device 200 may be separate from an object to be used by a user. In this case, the control device 200 can wirelessly transmit a control signal to the vehicle 20 based on a result of communication with the portable device 100 such that the vehicle 20 can be remotely controlled. As illustrated in FIG. 1, the control device 200 includes a first wireless communicator 210, a second wireless communicator 220, a storage 230, and a controller 240.

The first wireless communicator 210 has a function of performing communication with the portable device 100 based on the first wireless communication standard. In the following description, it is assumed that the first wireless communicator 210 is constituted as a communication interface that can perform communication using the signals in the RF band and the signals in the LF band.

The second wireless communicator 220 has a function of performing communication with the portable device 100 based on a second wireless communication standard which is different from the first wireless communication standard. In the following description it is assumed that the second wireless communicator 220 is constituted as a communication interface that can perform communication using signals in the UWB. A plurality of second wireless communicators 220 may be mounted in the vehicle 20.

The storage 230 has a function of storing various types of information for operating of the control device 200. For example, the storage 230 stores programs for operating of the control device 200, IDs (an example of identification information), passwords, and authentication algorithms for authentication, and the like. The storage 230 is constituted, for example, by a storage medium such as a flash memory and a processing device that performs writing and reading to and from the storage medium.

The controller 240 has a function of controlling the entire operations of the control device 200 and onboard devices mounted in the vehicle. For example, the controller 240 controls the first wireless communicator 210 and the second wireless communicator 220 such that communication with the portable device 100 is performed. The controller 240 performs reading information from the storage 230 and writing information to the storage 230. The controller 240 also serves as an authentication controller that controls an authentication process which is performed in cooperation with the portable device 100. The controller 240 also serves as a door lock controller that controls door lock of the vehicle and performs locking and unlocking of a door. The controller 240 also serves as an engine controller that controls an engine of the vehicle and performs starting/stopping of the engine. A power source provided in the vehicle may include a motor in addition to the engine. The controller 240 is constituted, for example, as an electronic control unit (ECU).

The control device 200 illustrated in FIG. 1 is an example of a control device in the claims. The configuration of the control device according to the present invention is not limited to the example illustrated in FIG. 1, but may include, for example, a communication module including the first wireless communicator 210, a communication module including the second wireless communicator 220, and a control module including the controller 240. The configuration of the control device according to the present invention may be realized as a communication module including the first wireless communicator 210, a communication module including the second wireless communicator 220, or a control module including the controller 240. The modules are connected to each other via a wired or wireless communication network. The communication network may be an onboard communication network based on an arbitrary standard such as a controller area network (CAN), a local interconnect network (LIN), or a local area network (LAN).

The configuration of the devices illustrated in FIG. 1 is an example. For example, in the configuration illustrated in FIG. 1, each of the portable device 100 and the control device 200 includes a first wireless communicator and a second wireless communicator, but the present invention is not limited thereto. Each of the portable device 100 and the control device 200 may include a wireless communicator that performs communication based on one wireless communication standard. A plurality of wireless communicators may be provided in the vehicle 20. The wireless communicator performs transmission and reception of signals used for an authentication process. A frequency band which is used for the wireless communicator to transmit signals used for an authentication process is arbitrary. For example, a signal used for an authentication process may be transmitted as a signal in the UWB, may be transmitted as a signal in the LF band, may be transmitted as a signal in the RF band, or may be transmitted as a signal in Bluetooth low energy (BLE (registered trademark)).

<2. Authentication Process>

In a smart entry system, the portable device 100 may be authenticated on the basis of a distance between the portable device 100 and the control device 200 of the vehicle. The authentication process in this embodiment includes a process of measuring a distance between the portable device 100 and the control device 200 (hereinafter also referred to as a "distance measuring process" in this specification) and a process of performing authentication on the basis of results of distance measuring. By performing authentication based on a distance, it is possible to reduce camouflage of an authentication target device such as a relay attack in which communication between a portable device (the authentication target device) and a control device (an authentication device) of a vehicle is indirectly realized by relaying transmission signals of the control device using a relay and authentication of the portable device by the control device is illegally established or camouflage of a distance and to effectively enhance authentication accuracy.

FIG. 2 is a sequence diagram illustrating an example of a basic flow of the authentication process according to the embodiment. As illustrated in FIG. 2, first, the control device 200 starts waiting of reception of a distance-measuring trigger signal (Step S100). In this embodiment, for example, a signal for instructing to transmit a first distance-measuring signal (a distance-measuring trigger signal) is transmitted from the portable device 100 before the first distance-measuring signal is transmitted from the control device 200. For example, a signal in the UWB is used as the distance-measuring trigger signal. The distance-measuring trigger signal is transmitted, for example, from the second wireless communicator 120 by the portable device 100. In the control device 200, it is assumed that the distance-measuring trigger signal is received by the second wireless communicator 220. In preparation of receiving the distance-measuring trigger signal, the control device 200 controls the second wireless communicator 220 such that the second wireless communicator 220 performs reception waiting. Reception waiting means a state in which a process of fetching a received signal is performed when the signal is received. The reception waiting is also referred to as a reception waiting state. The reception waiting includes various processes for acquiring a desired signal. Examples of the various processes include a process of causing an antenna constituting the second wireless communicator 220 to receive a signal, a process of causing the second wireless communicator 220 to sample the received signal, and a process of causing the second wireless communicator 220 to perform a process based on the signal acquired by sampling. Examples of the process of performing a process based on the signal acquired by sampling include subsequent processes such as a process of determining whether the signal received via the antenna is a desired signal and a process of ascertaining information included in the signal. A reception waiting time, that is, a period in the reception waiting state, is also referred to as a reception waiting period.

On the other hand, the portable device 100 transmits the distance-measuring trigger signal (Step S103). For example, a signal in the UWB is used as the distance-measuring trigger signal. Specifically, the portable device 100 may transmit the distance-measuring trigger signal using the second wireless communicator 120.

Subsequently, when the distance-measuring trigger signal is received, the control device 200 transmits a distance-measuring request signal for requesting a response for a distance measuring process as a first distance-measuring signal (Step S106). The process of transmitting the distance-measuring request signal is an example of the subsequent processes. For example, a signal in the UWB is used as the distance-measuring request signal. Specifically, the control device 200 may transmit the distance-measuring request signal using the second wireless communicator 220.

Then, when the distance-measuring request signal (the first distance-measuring signal) is received from the control device 200, the portable device 100 transmits a distance-measuring response signal for responding to a distance-measuring request as a second distance-measuring signal after a time ΔT2 has elapsed after the distance-measuring request signal has been received (Step S109). For example, a signal in the UWB is used as the distance-measuring response signal. Specifically, the portable device 100 may transmit the distance-measuring response signal using the second wireless communicator 120. The time ΔT2 is a prescribed time. The time ΔT2 is set to be longer than a time which is considered to be necessary for processes in the portable device 100 after the first distance-measuring signal has been received and until the second distance-measuring signal is transmitted. Accordingly, it is possible to reliably complete preparation of transmission of the second distance-measuring signal until the time ΔT2 elapses after the first distance-measuring signal has been received. The time ΔT2 may be known to the control device 200.

Subsequently, when the distance-measuring response signal (the second distance-measuring signal) is received, the controller 240 of the control device 200 calculates a distance between the portable device 100 and the control device 200 (Step S112). Specifically, the control device 200 measures a time ΔT1 from the transmission time point of the first distance-measuring signal to the reception time point of the second distance-measuring signal and calculates the distance on the basis of the measured time ΔT1 and the known time ΔT2. The control device 200 can calculate a time required for transmission and reception in one way of the signals by dividing a value obtained by subtracting ΔT2 from ΔT1 by 2, and calculate the distance between the portable device 100 and the control device 200 by multiplying the calculated time by a speed of the signals. The time ΔT2 may not be known to the control device 200. For example, the portable device 100 may measure the time ΔT2 and report the measured time to the control device 200. This report can be performed by transmitting a data signal including information obtained by encrypting information indicating the time ΔT2. The data signal is another example of the signal used for the distance measuring process. The data signal is a signal for including and carrying data. The data signal has a frame format including a payload part in which data is stored. The data signal can be transmitted and received as a signal in the UWB.

Calculating a distance in Step S112 may be performed by a controller of a communication unit when the second wireless communicator 220 is configured as the communication unit. In this case, the communication unit transmits the calculation results to the controller 140 via an onboard communication network. A plurality of second wireless communicators 220 may be mounted in the vehicle 20. The controller 240 may calculate the distance between the portable device 100 and the control device 200 on the basis of data transmitted and received between the plurality of second wireless communicators 220 and the portable device 100.

Then, the controller 240 of the control device 200 performs authentication of the portable device 100 depending on whether the calculated distance satisfies predetermined conditions (Step S115). For example, the controller 240 determines that authentication has succeeded when the calculated distance is equal to or less than a predetermined value and determines that the authentication has failed otherwise. The controller 240 may determine that authentication for performing corresponding predetermined control has succeeded when the calculated distance is in a predetermined range. For example, when a distance between a user carrying the portable device 100 and the vehicle 20 in which the control device 200 is mounted is in the predetermined range, the controller 240 may determine that authentication for performing control for turning on a light provided in the vehicle 20 has succeeded and perform control for turning on the light. When the user becomes closer to the vehicle 20, the controller 240 may determine that authentication for unlocking a door of the vehicle 20 has succeeded and perform control for unlocking the door.

<3. Conclusion>

The portable device 100 and the control device 200 according to this embodiment perform the distance measuring process for the purpose of authentication based on a distance. The distance measuring process according to this embodiment includes transmitting and receiving distance-measuring signals and calculating the distance on the basis of times required for transmitting and receiving the distance-measuring signals as illustrated in FIG. 2. The distance-measuring signals include, for example, a distance-measuring trigger signal for instructing to transmit a first distance-measuring signal, a distance-measuring request signal for requesting to transmit a response for the distance measuring process, and a distance-measuring response signal for responding to the distance measuring request.

The distance measuring process according to this embodiment may be performed a plurality of times. The control device 200 can acquire a measured distance value with higher accuracy as a representative value, for example, on the basis of results of the plurality of times of distance measuring. Since the control device 200 repeatedly performs the distance measuring process a plurality of times, though the distance measuring process fails once, the next distance measuring process may succeed. That is, it is possible to enhance accuracy of the measured distance value. Performing the distance measuring process a plurality of times includes re-transmitting the distance-measuring trigger signal from the portable device 100.

In general, power consumption in a signal receiving party in the reception waiting period of the signal is forced. For example, in the example illustrated in FIG. 2, when the second wireless communicator 220 is in the reception waiting state and fails to receive a distance-measuring trigger signal transmitted from the portable device 100, the reception waiting state is maintained until a next distance-measuring trigger signal is transmitted from the portable device 100. Since the reception waiting period is continued in this way, power consumption increases. Particularly, in the UWB, since power consumption in the reception waiting state is high, power consumption of the control device 200 increases due to continuation of the reception waiting period. Accordingly, for example, it may serve as one reason for a phenomenon in which an amount of electric power stored in a storage battery that supplies electric power to devices mounted in the vehicle 20 including the control device 200 decreases and the engine cannot be started. These circumstances are true of signals other than the signals for measuring a distance between devices. These circumstances are true of signals other than the signals for authenticating a device.

Therefore, in the embodiment of the present invention, the reception waiting time of a signal in a reception-side party is controlled at an appropriate timing Specifically, in the embodiment of the present invention, control for starting and ending reception waiting of signals on the reception-side party at appropriate timings is performed. Accordingly, it is possible to shorten the reception waiting period and to reduce power consumption in the reception-side party.

Transition to the reception waiting state according to this embodiment is performed at an arbitrary timing. The control device 200 starts reception waiting, for example, on the basis of information acquired through responding between the portable device 100 and the control device 200 which is performed before the distance-measuring trigger signal is transmitted. This information is also referred to as acquisition information in the following description. The signals used for responding and the distance-measuring signals used for the distance measuring process may be transmitted and received on the basis of different wireless communication standards. For example, the first wireless communication standard is used for transmission and reception of the signals used for responding, and the second wireless communication standard is used for transmission and reception of the distance-measuring signals.

Technical features of the embodiment of the present invention will be described below in detail.

<4. Technical Features>

FIG. 3 is a sequence diagram illustrating an example of a flow of the distance measuring process which is performed in the system 1 according to the embodiment. The portable device 100 and the control device 200 participate in this sequence. In this specification, the "authentication process based on a distance" includes a distance measuring process of measuring a distance between the portable device 100 and the control device 200 and an authentication process of performing authentication on the basis of the distance measured in the distance measuring process.

The controller 240 in this embodiment causes the second wireless communicator 220 to transition to a reception waiting state of a distance-measuring trigger signal at an arbitrary timing and waits for reception of a distance-measuring trigger signal. The arbitrary timing is determined, for example, on the basis of communication between the portable device 100 and the control device 200 which is performed before a distance-measuring trigger signal in the UWB is transmitted from the portable device 100. The communication which is performed between the portable device 100 and the control device 200 before a distance-measuring trigger signal is transmitted or received may be performed, for example, by the first wireless communicator that can perform communication using a signal in the RF band and a signal in the LF band.

In the example illustrated in FIG. 3, an example of the communication performed between the portable device 100 and the control device 200 before a distance-measuring trigger signal is transmitted or received is request-response authentication. In the request-response authentication, an authentication request signal and an authentication response signal generated on the basis of an authentication request are transmitted and received. By performing the authentication process by one step using another method before the authentication process based on a distance is performed, it is possible to further enhance authentication accuracy.

As illustrated in FIG. 3, first, the portable device 100 transmits an authentication request signal using the first wireless communicator 110 (Step S203). Then, when the authentication request signal is received by the first wireless communicator 210, the control device 200 transmits an authentication response signal as a response to the authentication request signal using the first wireless communicator 210 (Step S206).

The request-response authentication is a system in which an authenticator generates an authentication request signal and transmits the authentication request signal to an authentication target, the authentication target generates an authentication response signal on the basis of the authentication request signal and transmits the authentication response signal to the authenticator, and the authenticator performs authentication of the authentication target on the basis of the authentication response signal. Typically, since the authentication request signal is a random number and varies every authentication, the request-response authentication has resistance to a replay attack. The authentication response signal is generated on the basis of information of the authentication target. The information of the authentication target is, for example, an ID or a password. Since the ID and the password are not actually transmitted or received, it is possible to prevent tapping. More specifically, for example, in response to a first authentication signal transmitted as an authentication request by the portable device 100, a second authentication signal calculated on the basis of the first authentication signal and key information such as a password stored in advance by the control device 200 is transmitted as an authentication response. When it is ascertained that the second authentication signal transmitted as the authentication response indicates a regular value which is calculated on the basis of the first authentication signal which is the authentication request and the key information, the portable device 100 may determine that authentication in the control device 200 has succeeded. The control device 200 may be an authenticator, and the portable device 100 may be an authentication target. The portable device 100 which is the authenticator may notify the control device 200 which is the authentication target of the authentication result.

Subsequently, the controller 240 acquires information on the request-response authentication and performs control for starting reception waiting of a distance-measuring trigger signal in the second wireless communicator 220 at a predetermined timing on the basis of the acquisition information (Step S209). The request-response authentication is an example of the communication which is performed before the distance-measuring trigger signal is transmitted as described above. The controller 240 acquires information on the communication performed before the distance-measuring trigger signal is transmitted as the acquisition information.

The acquisition information on the request-response authentication may include, for example, a transmission or reception time point of an authentication request signal, a transmission or reception time point of an authentication response signal, and results of the request-response authentication. The controller 240 may start reception waiting of the distance-measuring trigger signal, for example, at a time point at which a predetermined time has elapsed from the transmission or reception time point of the authentication response signal or a time point at which the request-response authentication has succeeded as the predetermined timing based on the acquisition information. The predetermined time may be set to, for example, a time shorter than a time required for the portable device 100 to perform the processes after the authentication response signal has been received and until the distance-measuring trigger signal is transmitted. That is, the controller 240 can predict the time in which the distance-measuring trigger signal is transmitted on the basis of the acquisition information and perform control for starting reception waiting of the distance-measuring trigger signal. Information on time synchronization of signals such as information of in what clocks (seconds) after the authentication response signal has been received the distance-measuring trigger signal is to be transmitted may be shared in advance by the portable device 100 and the control device 200.

By causing the controller 240 to start reception waiting as immediately as possible before the timing at which transmission of the distance-measuring trigger signal is predicted, it is possible to shorten the reception waiting period and to further reduce power consumption in the reception-side party.

The acquisition information may be acquired from a plurality of sources. For example, the controller 240 may acquire the acquisition information on the transmission or reception time point of the authentication request signal and the transmission or reception time point of the authentication response signal from the first wireless communicator 210. When the first wireless communicator 210 is provided in a device other than the control device 200, the acquisition information can be acquired from the other device. The other device is, for example, a communication device mounted in the vehicle 20. When request-response authentication is performed by a device other than the control device 200, the controller 240 may acquire results of the request-response authentication from the other device. The other device is, for example, a combined ECU mounted in the vehicle 20. When the controller 240 has a function of controlling the first wireless communicator 210 or a function of performing request-response authentication, the acquisition information is acquired inside the controller 240.

Subsequently, the controller 240 ends the reception waiting after a prescribed time has elapsed after the reception waiting has started (Step S215). The prescribed time is a first prescribed time in the claims. The controller 240 performs control for ending reception waiting after the first prescribed time has elapsed after the reception waiting has started. That is, when the distance-measuring trigger signal has not been received in the first prescribed time, the controller 240 ends the reception waiting without receiving a distance-measuring trigger signal. When a distance-measuring trigger signal is received before the first prescribed time has elapsed, the controller 240 ends the reception waiting at that time point. In the example illustrated in FIG. 3, a case in which a distance-measuring trigger signal has not been received during the reception waiting is described.

The first prescribed time may be set to, for example, a time longer than a time in which a distance-measuring trigger signal reaches the control device 200 when a distance in an allowable range in which authentication based on a distance succeeds is assumed. This "time longer than the time in which the signal reaches" can include an error. Accordingly, it is possible to enhance a probability of reception success.

After the reception waiting has ended, for example, the controller 240 performs control in a normal state in which power consumption is lower than that in the reception waiting state and reception and transmission of a signal from and to the portable device 100 are not performed.

Subsequently, the controller 240 causes the second wireless communicator 220 to start reception waiting for receiving a distance-measuring trigger signal after a prescribed time has elapsed after the reception waiting has ended without receiving a distance-measuring trigger signal (Step S218). The prescribed time is a second prescribed time in the claims. The second prescribed time may be set to, for example, a time shorter than a time interval at which a distance-measuring trigger signal is re-transmitted. In this way, according to the embodiment, by performing control such that the reception waiting is not continued until a next distance-measuring trigger signal is received even when a distance-measuring trigger signal has not been received, it is possible to reduce power consumption in a reception-side party. The controller 240 continues to perform reception waiting until a prescribed time (period) elapses again. This prescribed time may be the same as the first prescribed time.

Then, a distance-measuring trigger signal is transmitted from the portable device 100 (Step S221).

Subsequently, when a distance-measuring trigger signal is received during the reception waiting, the controller 240 of the control device 200 ends the reception waiting (Step S224). When the first prescribed time elapses without receiving a distance-measuring trigger signal again, the controller 240 repeatedly performs the processes of Steps S215 to S218. That is, the controller 240 acquires information indicating that the reception waiting has ended without receiving a distance-measuring trigger signal as acquisition information and performs control such that reception waiting starts again at a predetermined timing, specifically, after the second prescribed time elapses, on the basis of the acquisition information. By performing normal control in the second prescribed time, it is possible to reduce power consumption. The number of times Steps S215 to S218 are repeated until a distance-measuring trigger signal is received may be limited to an upper limit.

Subsequently, when a distance-measuring trigger signal is normally received, the controller 240 performs control for transmitting a distance-measuring request signal for requesting a response for the distance measuring process as the first distance-measuring signal using the second wireless communicator 220 in response to the distance-measuring trigger signal (Step S227). When the distance-measuring request signal is transmitted, the controller 240 performs, for example, control in a transmission state. The transmission state is a state in which various processes of radiating a signal as radio waves from an antenna are performed. Examples of the various processes include generating a signal to be transmitted, modulation based on the signal to be transmitted, and transmitting of radio waves from the antenna. Power consumption in the transmission state is lower than that in the reception waiting state.

Subsequently, the controller 240 of the control device 200 starts reception waiting when the reception waiting has ended because a prescribed time has elapsed after a desired signal (the distance-measuring trigger signal herein) has been received (Step S230). The prescribed time is a third prescribed time in the claims. The third prescribed time may be set to, for example, a time shorter than a time which is assumed to be required for processing in the portable device 100 after the distance-measuring request signal has been received and until a distance-measuring response signal is transmitted.

That is, the controller 240 in this embodiment performs control for acquiring information indicating that a desired signal (a distance-measuring trigger signal herein) has been normally received and causing the second wireless communicator 220 to start reception waiting of a desired signal (a distance-measuring response signal herein) at a predetermined timing (after the third prescribed time has elapsed herein) on the basis of the acquisition information (also referred to as normal acquisition information). The normal acquisition information may be acquired, for example, from the second wireless communicator 220. When the controller 240 has a function of controlling the second wireless communicator 220, the acquisition information can be acquired in the controller 240. The normal acquisition information may include a reception time point of the distance-measuring trigger signal.

A measurement start time point in the third prescribed time is not limited to the reception time point of the distance-measuring trigger signal, but may be, for example, a time point after a distance-measuring request signal has been transmitted. In this case, the normal acquisition information may include a transmission time point of the distance-measuring request signal.

The reception waiting time (period) which has started at a predetermined timing on the basis of the normal acquisition information is set to a fourth prescribed time. The fourth prescribed time may be set to, for example, a time longer than a time in which a distance-measuring response signal reaches the control device 200 when a distance in an allowable range in which authentication based on a distance succeeds is assumed. The fourth prescribed time may be shorter than the first prescribed time. Since reception waiting starts at the predetermined timing based on the normal acquisition information, it can be said that a more accurate timing is predicted. Accordingly, even when the reception waiting time is set to the fourth prescribed time shorter than the first prescribed time, it is possible to receive a desired signal. The fourth prescribed time shorter than the first prescribed time is, for example, a time excluding an error considered in the first prescribed time. By further shortening the reception waiting time in this way, it is possible to reduce power consumption.

On the other hand, when a distance-measuring request signal is received from the control device 200, the portable device 100 transmits a distance-measuring response signal responsive to the distance-measuring request as the second distance-measuring signal after the time ΔT2 has elapsed after the distance-measuring request signal has been received (Step S233).

When the distance-measuring response signal is received, the controller 240 of the control device 200 ends the reception waiting (Step S236). Then, the controller 240 calculates a distance between the portable device 100 and the control device 200. Specifically, as described above with reference to FIG. 2, the controller 240 measures the time ΔT1 from the transmission time point of the distance-measuring request signal to the reception time point of the distance-measuring response signal and calculates the distance on the basis of the measured time ΔT1 and the known time ΔT2.

When the fourth prescribed time has elapsed without receiving a distance-measuring response signal, the controller 240 ends the reception waiting. At this time, the controller 240 acquires information indicating that the reception waiting has ended without receiving a distance-measuring response signal and starts reception waiting of a distance-measuring trigger signal again at a predetermined timing based on the acquisition information. For example, the controller 240 may perform control for predicting a time at which the distance-measuring trigger signal is re-transmitted from the reception time point of the distance-measuring trigger signal and starting reception waiting of a distance-measuring trigger signal prior to that time.

The controller 240 may perform control in the reception waiting state at a predetermined timing in preparation of reception of a next distance-measuring trigger signal again after the reception waiting has ended because a distance-measuring response signal has been normally received. That is, the controller 240 acquires information indicating that the reception waiting has ended because the distance-measuring response signal has been normally received (an example of the normal acquisition information) and starts reception waiting of a distance-measuring trigger signal again after a predetermined timing based on the acquisition information. For example, the controller 240 may perform control for predicting a time at which a next distance-measuring trigger signal is re-transmitted from the reception time point of the previous distance-measuring trigger signal and starting the reception waiting of a distance-measuring trigger signal prior to that time point. The controller 240 may perform control for predicting a time at which a next distance-measuring trigger signal is re-transmitted from the reception time point of the distance-measuring response signal and starting reception waiting of a distance-measuring trigger signal prior to that time. The controller 240 may set the reception waiting time in this case to be equal to the fourth prescribed time. More specifically, the controller 240 may set the reception waiting time to a time which is longer than a time in which a distance-measuring trigger signal reaches the control device 200 when a distance in an allowable range in which authentication based on a distance succeeds is assumed and which is shorter than the first prescribed time. Since the controller 240 starts reception waiting at a predetermined timing based on the normal acquisition information indicating that the distance-measuring trigger signal has been normally received or the distance-measuring response signal has been normally received, it can be said that a more accurate timing is predicted. Accordingly, even when the reception waiting time is set to a time shorter than the first prescribed time, it is possible to receive a desired signal.

One second wireless communicator 220 has been employed in FIG. 3 described above, but the number of second wireless communicators 220 may be two or more. The two or more second wireless communicators 220 perform transmission and reception of signals to and from the second wireless communicator 120 of the portable device 100. In this case, the controller 240 can calculate a distance between each second wireless communicator 220 and the portable device 100.

When at least one of the two or more second wireless communicator 220 has normally received a distance-measuring trigger signal but the other second wireless communicator 220 has not received a distance-measuring trigger signal, the controller 240 may perform control for ending the reception waiting in the other second wireless communicator 220. Accordingly, it is possible to further shorten the reception waiting time and to reduce power consumption.

In the embodiment described above with reference to FIG. 3, the authentication request signal is transmitted in communication which is performed between the portable device 100 and the control device 200 before the distance-measuring trigger signal is transmitted and received, but the present invention is not limited thereto. For example, transmission and reception of a wakeup signal for instructing to start and a response to the wakeup signal may be performed between the portable device 100 and the control device 200. The reception-side party can be returned from a sleep state using the wakeup signal. Examples of the response to the wakeup signal include an acknowledgement (ACK) signal indicating that starting is to be performed and a negative acknowledgement (NACK) signal indicating that starting is not to be performed.

Alternatively, before reception waiting of a distance-measuring trigger signal, both of responding to the wakeup signal and request-response authentication may be sequentially performed between the portable device 100 and the control device 200. The control device 200 starts the reception waiting of a distance-measuring trigger signal on the basis of responding to the wakeup signal or request-response authentication.

In responding to the wakeup signal or request-response authentication, a signal transmitted from one device to the other device is also referred to as a first notification signal. A signal transmitted from the device having received the first notification signal to the device having transmitted the first notification signal is also referred to as a second notification signal. Each device determines that authentication of the other device has succeeded only when the regular second authentication signal corresponding to the first authentication signal has been transmitted as a response to the first authentication signal.

A frequency band which is used to transmit the first and second notification signals is arbitrary. For example, the notification signals may be transmitted using the same frequency band as the distance-measuring signals such as the distance-measuring trigger signal and the distance-measuring request signal or may be transmitted using a frequency band different from that of the distance-measuring signals. The notification signals may be transmitted as signals in the UWB, may be transmitted as signals in the LF band, may be transmitted as signals in the RF band, or may be transmitted as signals in Bluetooth low energy (BLE (registered trademark)).

<5. Conclusion>

While an exemplary embodiment of the present invention has been described above in detail with reference to the accompanying drawings, the present invention is not limited to the embodiment. It will be apparent to those skilled in the art to which the present invention belongs can think out various alterations or modifications within the technical spirit described in the appended claims and the alterations or modifications belong to the technical scope of the present invention.

For example, an example in which a first distance-measuring signal is transmitted from an authenticator party has been described above in the aforementioned embodiment, but the present invention is not limited to this example. The authenticator party is, for example, the control device 200 of the vehicle 20. For example, an authentication target party may transmit the first distance-measuring signal. The authentication target party is, for example, the portable device 100. When a first distance-measuring signal is received from the portable device 100, the control device 200 transmits a second distance-measuring signal as a response to the first distance-measuring signal. When the second distance-measuring signal is received, the portable device 100 measures a time ΔT1 from the transmission time point of the first distance-measuring signal to the reception time point of the second distance-measuring signal. Subsequently, the portable device 100 transmits a data signal including information obtained by encrypting information indicating the measured time ΔT1. On the other hand, the control device 200 measures a time ΔT2 from the reception time point of the first distance-measuring signal to the transmission time point of the second distance-measuring signal. When the data signal is received from the portable device 100, the control device 200 calculates a distance between the portable device 100 and the control device 200 on the basis of the time ΔT1 indicated by the data signal received from the portable device 100 and the measured time ΔT2. For example, the time required for transmission and reception of the signals in one way is calculated by dividing ΔT1-ΔT2 by 2, and the distance between the portable device and the communication unit is calculated by multiplying the time by a speed of a signal. In this way, when the directions of transmission and reception of the first distance-measuring signal and the second distance-measuring signal are interchanged, the control device 200 performs control for transitioning to the reception waiting state in which the first distance-measuring signal transmitted from the portable device 100 is waited for. The aforementioned embodiment can be applied to the control of the reception waiting state in which the first distance-measuring signal is waited for.

In the aforementioned embodiment, an example in which the authentication target is the portable device 100 and the authenticator is the control device 200 of the vehicle 20 has been described above, but the present invention is not limited to this example. The roles of the portable device 100 and the control device 200 of the vehicle 20 may be interchanged, or may be dynamically interchanged. Positioning and authentication may be performed between control devices 200 of vehicles 20.

In the aforementioned embodiment, the portable device 100 is an example of the communication device and the control device 200 is an example of the control device, but the present invention is not limited thereto. The portable device 100 may be an example of the control device, and the control device 200 may be an example of the communication device.

For example, an example in which the present invention is applied to a smart entry system has been described above in the embodiment, but the present invention is not limited to the example. The present invention is applicable to an arbitrary system that performs distance measuring and authentication through transmission and reception of signals. Examples of an object which is used by a user include a drone, a vehicle, a ship, an aircraft, a building, a robot, a locker, and a home appliance. The building may include a house. The present invention is applicable to a pair including two arbitrary devices of a portable device, a vehicle, a ship, an aircraft, a smartphone, a drone, a building, a robot, a locker, and a home appliance. This pair may include two devices of the same type or include two devices of different types. In this case, one device operates as a first communication device, and the other device operates as a second communication device.

For example, an example in which UWB is used as a wireless communication standard has been described above in the embodiment, but the present invention is not limited to this example. For example, a communication standard using infrared rays may be used as a wireless communication standard.

For example, an example in which the controller 240 is configured as an ECU and controls the entire operations of the control device 200 has been described above in the embodiment, but the present invention is not limited to this example. For example, each of the first wireless communicator 210 and the second wireless communicator 220 may include an ECU. In this case, the first wireless communicator 210 and the second wireless communicator 220 are also referred to as communication devices mounted in a mobile object. Similarly to the aforementioned control device 200, each communication device mounted in a mobile object may perform the processes based on authentication information included in a received signal or the processes of controlling transition to the reception waiting state.

A series of processes which is performed by the devices described above in this specification may be realized using one of software, hardware, and a combination of software and hardware. Programs constituting the software are stored, for example, in recording media (non-transitory media) which are provided inside or outside of each device in advance. For example, the programs are read to a RAM and executed by a processor such as a CPU when a computer executes the programs. Examples of the recording media include a magnetic disk, an optical disc, a magneto-optical disc, and a flash memory. The computer programs may be delivered, for example, via a network without using recording media.

Processes described above with reference sequence diagrams or flowcharts in this specification may necessarily not be performed in the illustrated orders. Some process steps may be performed in parallel. An additional process step may be employed or some process steps may be omitted.

REFERENCE SIGNS LIST 1 system
100 portable device
110 first wireless communicator
120 second wireless communicator
130 storage
140 controller
20 vehicle
200 control device
210 first wireless communicator
220 second wireless communicator
230 storage
240 controller

The invention claimed is:

1. A control device comprising a controller configured to control a communicator such that the communicator performs wireless communication with another device,
wherein the controller controls, on a basis of acquired acquisition information, a reception waiting time of a predetermined signal which is transmitted from the other device by the wireless communication, and
the controller acquires information, as the acquisition information, on a request-response authentication performed between the control device and the other device before the predetermined signal is transmitted.

2. The control device according to claim 1, wherein the controller performs control for starting reception waiting of the predetermined signal and ending the reception waiting after a prescribed time has elapsed after the starting as control of the reception waiting time.

3. The control device according to claim 2, wherein the controller performs control for starting the reception waiting at a predetermined timing based on the acquisition information.

4. The control device according to claim 3, wherein the controller performs control for ending the reception waiting after a first prescribed time based on the acquisition information has elapsed after the reception waiting has been started.

5. The control device according to claim 4, wherein the controller performs a process of receiving the predetermined signal from the other device and fetching the received signal as the reception waiting.

6. The control device according to claim 4, wherein the controller performs control for ending the reception waiting when the predetermined signal is received during the reception waiting.

7. The control device according to claim 6, wherein the controller performs a distance measuring process of measuring a distance between the other device and the communicator using the predetermined signal.

8. The control device according to claim 4, wherein the controller predicts a time at which the predetermined signal is transmitted from the other device as the predetermined timing on the basis of the acquisition information.

9. The control device according to claim 4, wherein the controller performs control for starting the reception waiting again after a second prescribed time has elapsed from the ending when the reception waiting has ended without receiving the predetermined signal.

10. The control device according to claim 4, wherein the controller performs an authentication process of authenticating the other device using information acquired through wireless communication with the other device, and
wherein the predetermined signal is a signal for notifying that the authentication process has started.

11. The control device according to claim 10, wherein the controller performs a process of measuring a distance between the other device and the communicator and authenticating the other device on the basis of the measured distance as the authentication process.

12. The control device according to claim 1, wherein the responding is performed using a wireless communication standard different from a wireless communication standard used for transmission and reception of the predetermined signal.

13. The control device according to claim 1, wherein an ultra-wide band (UWB) is used in the wireless communication which the communicator performs with the other device to receive the predetermined signal.

14. The control device according to claim 1, wherein the control device is mounted in a mobile object, and
wherein the other device is carried by a user of the mobile object.

15. A control device comprising a controller configured to control a communicator such that the communicator performs wireless communication with another device,
wherein the controller controls, on a basis of acquired acquisition information, a reception waiting time of a predetermined signal which is transmitted from the other device by the wireless communication, and
the controller acquires information, as the acquisition information, indicating that the predetermined signal has been received during the reception waiting time and controls the reception waiting time of a next signal on the basis of the acquired information.

16. A control method that is performed by a processor, the control method comprising:
controlling a communicator such that the communicator performs wireless communication with another device;
acquiring acquisition information on a request-response authentication performed between the communicator and the other device; and
controlling, on a basis of the acquisition information, a reception waiting time of a predetermined signal which is transmitted from the other device by the wireless communication.

* * * * *